United States Patent

[11] 3,543,954

[72] Inventor Carl E. Marshall
 123 Liberty St., Franklin, Pennsylvania 16323
[21] Appl. No. 777,628
[22] Filed Nov. 21, 1968
 Continuation of Ser. No. 566,785, July 21, 1966, abandoned.
[45] Patented Dec. 1, 1970

[54] MATERIAL HANDLING APPARATUS
 12 Claims, 12 Drawing Figs.
[52] U.S. Cl. .................................................. 214/17,
 198/103, 214/83.14, 214/83.26, 214/519
[51] Int. Cl. ............................................... B60p 1/36

[50] Field of Search....................................... 214/518,
 519, 83.26, 83, 17.64, 22, 83.14; 198/62, 103, 53;
 259/24, 44

[56] References Cited
 UNITED STATES PATENTS
 655,552   8/1900   Gorton..................... 214/22X
 1,089,675 3/1914   Sangster................... 214/22

Primary Examiner—Albert J. Makay
Attorney—E. Wallace Breisch

ABSTRACT: A material handling apparatus having an upwardly open compartment receiving material to be handled and a method and means for distributing such material throughout the compartment.

Patented Dec. 1, 1970

INVENTOR.
Carl E. Marshall.

INVENTOR.
Carl E. Marshall.

INVENTOR.
Carl E. Marshall.

INVENTOR.
Carl E. Marshall.

MATERIAL HANDLING APPARATUS

This application is a continuation of U.S. Pat. application Ser. No. 566,785, filed July 21, 1966, now abandoned.

The present invention concerns an improved method and means for distributing particulate material delivered into a load compartment whereby material is uniformly distributed throughout the confines of the load compartment. The distributing means of the present invention consists of at least one elongated arm member pivotably supported for movement in a path or orbit extending over the bottom surfaces of the load compartment. The pivotable member has one elongated face portion which encounters loaded material and is disposed rearwardly of the pivot axis with respect to the direction of movement of the arm member along the orbit, thus being operable as a trailing blade. The resistance forces of the material acting on this face portion combine with the orbiting forces to provide a resultant dynamic force having a component which produces a moment about the pivot axis to effect a pivoting of the arm member to rise with the rising level of material being loaded into the compartment. The arm member continues to rise until the line of the resultant dynamic force passes through the pivot axis at which time the arm member will no longer rise and will remain stabilized in a fixed plane. The elongated arm member has a second elongated face portion which is a retreating face with respect to the one elongated face portion previously described. When the direction of movement of the arm member along the orbit is reversed the retreating face will encounter material and since such retreating face is disposed forwardly of the pivot point the resultant dynamic force acting on the arm member will have a component producing a moment about the pivot point which will cause a downward urging of the arm member. The method of the present invention comprises the steps of loading material into a load compartment, distributing such material about the confines of the load compartment by a movable member, raising the moving member with the level of the material pile, and using the same arm member to provide rapid discharge of the material from the compartment.

Various advantages of the present invention will become apparent upon consideration of the following description and drawings, in which.

Figure 1:
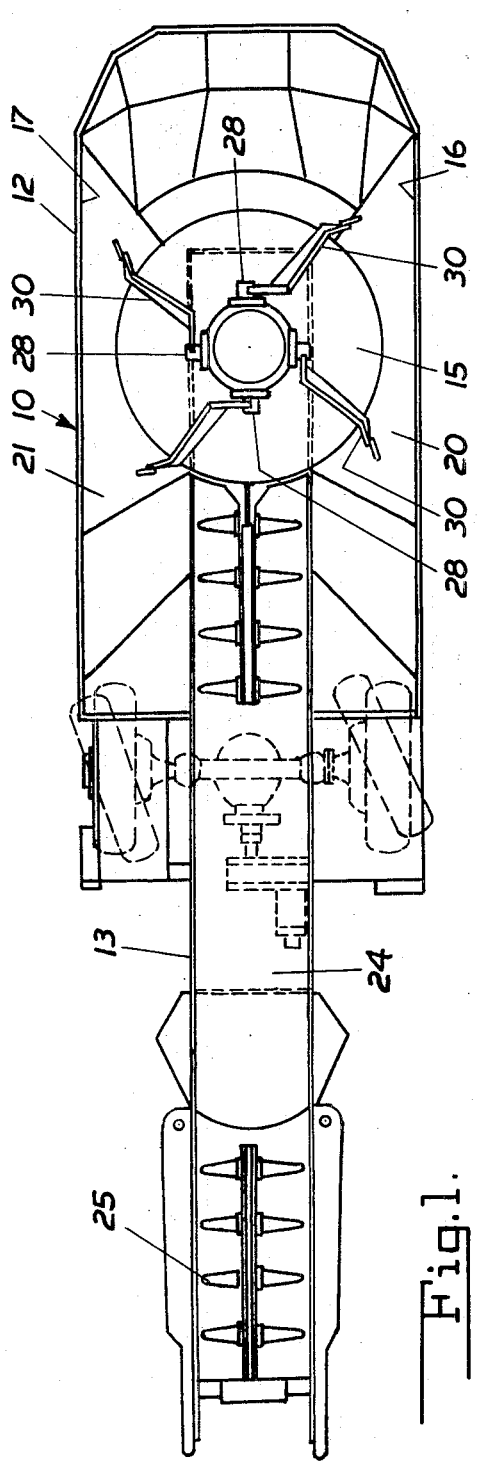
FIG. 1 is a top plan view of a material handling apparatus embodying the distribution means of the present invention.
Figure 2:
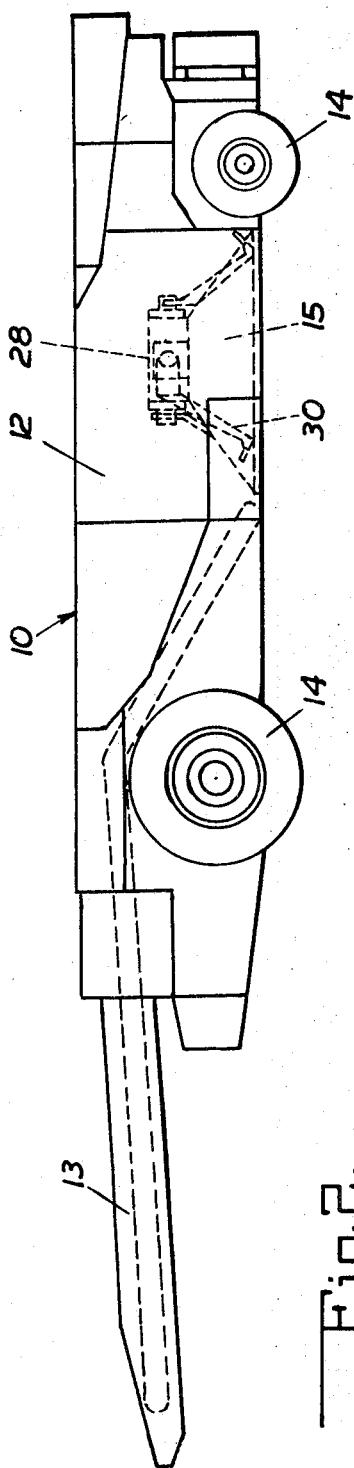
FIG. 2 is a side elevational view of a material-handling apparatus of FIG. 1.

Referring now to the drawings, there is shown a material-handling apparatus 10 having the general configuration of the apparatus described in the copending application having the Ser. No. 403,435, filed Sept. 30, 1964, now U.S. Pat. No. 3,278,062, and assigned to the assignee of the present invention. Briefly, such apparatus 10 comprises an elongated, open top, dish shaped body 12 and a rearwardly longitudinally-extending laterally-swingable rear end member 13. The body 12 and rear end member 13 are supported for mobility by oppositely laterally-arranged suitably-driven ground-engaging front and rear wheels 14. The body 12 has a centrally-disposed bearing-support portion shown as an upwardly converging, frustoconical bottom portion 15 and sidewalls 16 and 17 having upwardly sloping portions 18 and 19 respectively, extending laterally outwardly from bottom portion 15, and vertical portions 20 and 21 extending upwardly from the outer reaches of sloping portions 18 and 19 which vertical portions terminate in top edges 22 and 23 respectively. The forward end of body 12 comprises a forward wall 27 sloping upwardly from the lower forward edge of bottom portion 15. A continuous trough 24 extends rearwardly from the rearwardmost portion of bottom 15 and extends through the rear end member 13. An endless, single chain driven flight conveyor 26 is disposed in trough 24 for discharging material from body 12.

It is to be noted that the bearing-support portion could be a generally cylindrical member joined to a substantially flat bottom portion by a suitably shaped foot portion thereof, and that the single chain flight conveyor 25 can be any suitable conveyor such as double chain or bar type or the like.

It is further to be noted that in the case of noncircular orbit at the arm portion 32 would be generally normal to a pivot axis which is a radius vector (a line normal to a tangent of the orbit at a given point).

Figure 3:
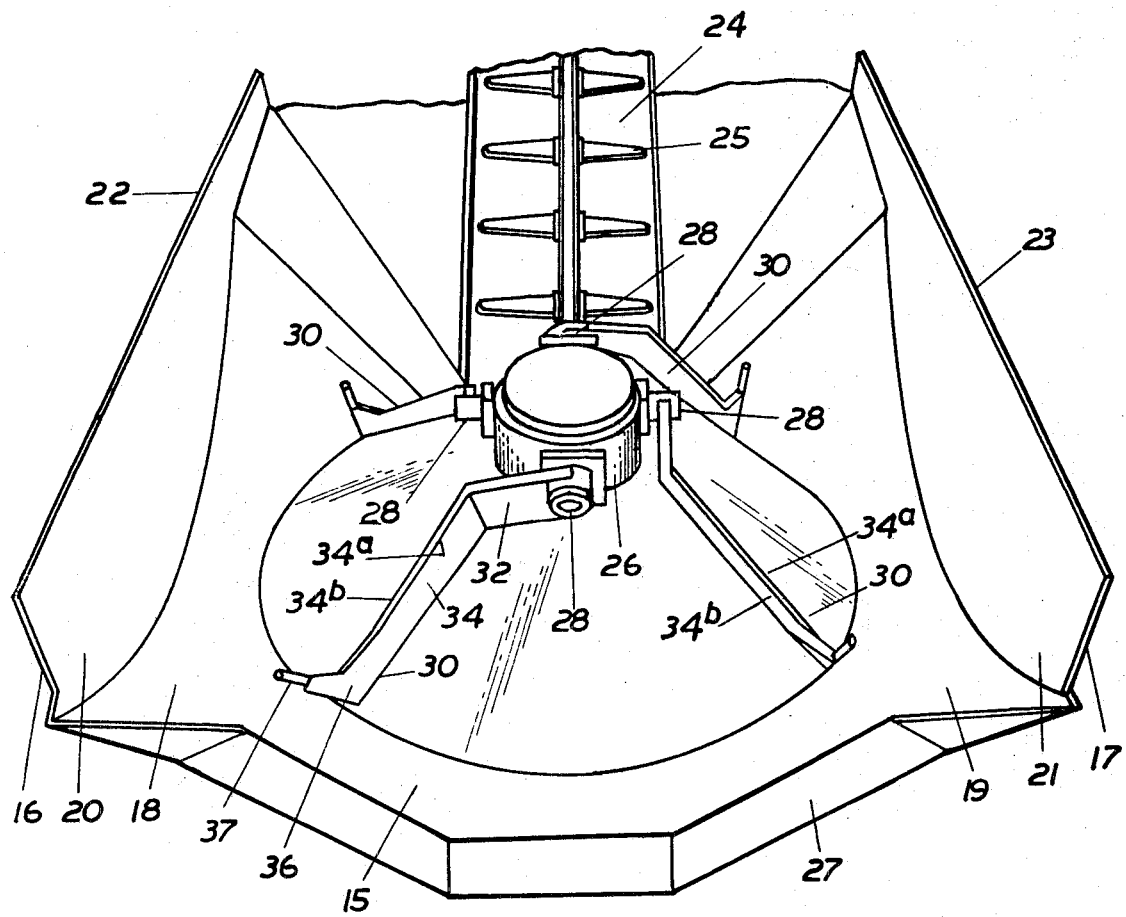
FIG. 3 is a perspective view of a substantial portion of the apparatus of FIG. 2.

A hub member 26 (see FIG. 3) is arranged centrally of the bottom portion 15 which hub member is connected with a reversible motor (not shown) for rotation about a vertical axis of rotation in either a clockwise or counterclockwise direction as viewed in plan. The hub member 26 has four generally cylindrical pivot pins 28 extending radially outwardly from an upper portion thereof and spaced 90° apart with their respective centerlines lying in a common plane normal to the axis of rotation of hub member 26. Each pivot pin 28 supports an identical distributing arm 30. For the sake of clarity one distributing arm 30 and its relationship to sidewall 16 and bottom portion 15 will be described with the understanding that such description relates to all of the distributing arms 30. The distributing arm 30 has an elongated support portion 32 with a circular opening 33 at one end thereof for pivotal mounting of support portion 32 on a pivot pin 28, which support portion is normal to the centerline of pivot pin 28 and, when body 12 is empty, extends laterally and downwardly from pivot pin 28 in a direction clockwise from pivot pin 28 as viewed in FIG. 3. The support portion 32 is fixed against sliding on pivot pin 28 by any suitable retaining means. The end of the support 32 away from opening 33 has fixed thereto and extending at an angle slightly greater than 90° obliquely away from the radial axis of pin 28 the wide end of an elongated parallel faced, tapered material encountering or working portion 34 having an advancing or working face 34a and a retreating face 34b which working portion 34, when body 12 is empty, extends towards the sloping portion 18 of sidewall 16 and has its bottom surface closely adjacent the surface of the bottom portion 15. The working portion 34 is also inclined about 20° clockwise with respect to the plane containing the axis of hub member 26 and the bottom edge of working face 34a facing upwardly from bottom portion 15. The narrow end of working portion 34 has an upwardly tapering finger portion 36 fixed thereto which finger portion has an upwardly extending cylindrical rod 37 fixed thereto. Together the finger portion 36 and cylindrical rod 37, when body 12 is empty, are adjacent, parallel to, and coextensive with a substantial length of the sloping portion 18 of sidewall 16.

The method of distributing material to which the present invention pertains can be best understood by referring to the material loading and discharging sequence illustrated in FIGS.

Figure 4:
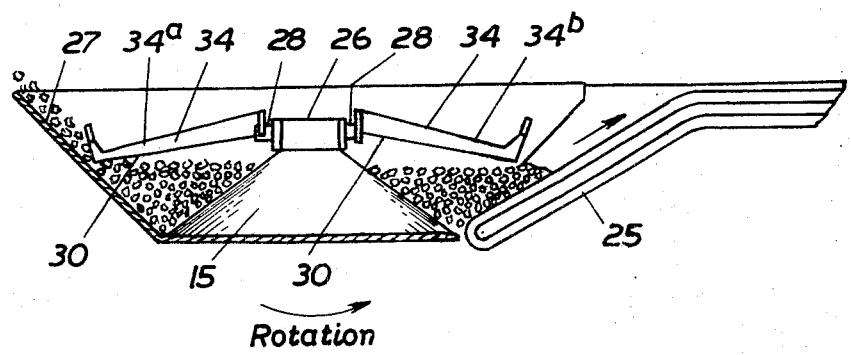
FIG. 4 is a diagrammatic representation of a material handling apparatus such as that shown in FIGS. 1 and 2 showing a portion of the distributing means positioned with respect to a level of material.
Figure 5:
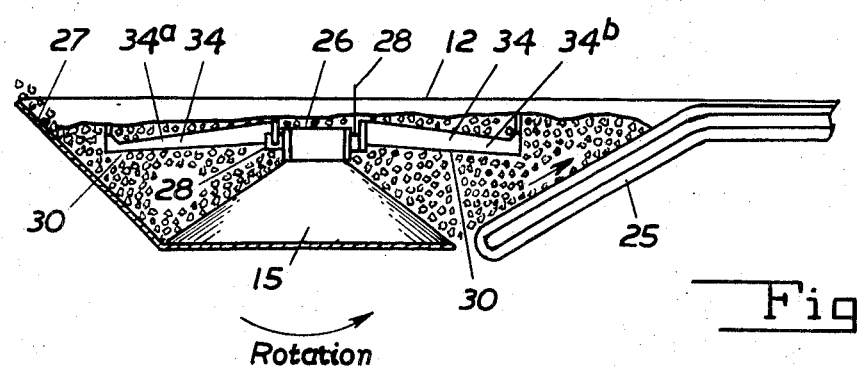
FIG. 5 is a view similar to FIG. 4 showing the material at a higher level and the portion of the distributing means in another position with respect to such material.

4—7. FIG. 4 shows material being loaded into the body 12 over the forward wall 27 thereof and the hub member 26 being rotated in a counterclockwise direction. The advancing face 34a of working portion 34 of each distributing arm 30 will encounter material and the resistence forces of the material acting on working portion 34 will act with the rotational forces about the axis of pivot pin 28 to impart on the distributing arm 30 a resultant force having vertical and horizontal components. The moment due to such vertical and horizontal components of that force will cause the distributing arm 30 to pivot upwardly and rise with the rising level of the material pile. During this stage of the loading operation, the distributing arm 30 will float near the top surface of the material pile and will uniformly spread the material about the inner confines of body 12. Each distributing arm 30 will continue to rise until the line of direction of the resultant dynamic force acting on the working portion 34 passes through the pivot pin 28 to which such arm 30 is attached, at which time the moments acting about the pivot pin 28 will cancel each other, and the arm 30 will cease rising with the rising level of material. In other words the attitude of the distributing arms 30 will become stabilized with faces 34a above the plane of the axes of the pivot pins 28. Any additional material loaded into the body 12 will accumulate above each distributing arm 30 and will be distributed uniformly about the inner confines of body 12 as shown in FIG. 5.

A major advantage in the operation of the arms of this invention resides in the reduced power required to maintain the rotation of these arms in a nearly full compartment as compared with arms of the prior art.

Figure 6:
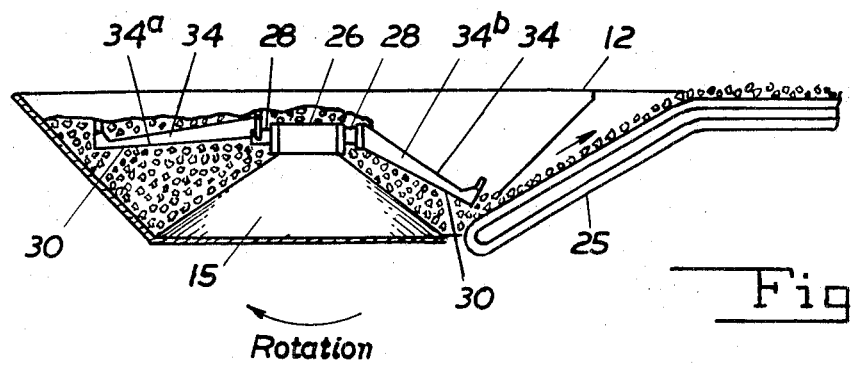
FIG. 6 is a view similar to FIG. 4 showing the material being discharged from the material-handling apparatus and portions of the distributing means positioned with respect to the level of the material.
Figure 7:
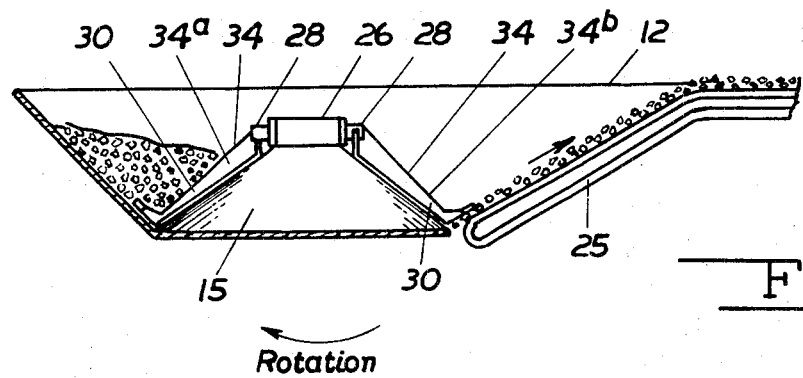
FIG. 7 is a view similar to FIG. 6 showing material being further discharged and portions of the distributing means differently positioned with respect to the level of the material.

FIG. 6 illustrates the beginning of the discharge cycle at which time the conveyor 25 is operated an and the hub member 26 rotated in a clockwise direction. The hub member 26 is, desirably, rotated at a rotational speed somewhat higher than during the filling cycle in order to impart the necessary torque to the distributing arms 30 for rapid discharge of material from the body 12. With the hub member 26 being rotated in a clockwise direction the retreating face 34b of working portion 34 is inclined into the material pile. The vertical and horizontal components of the resultant dynamic force acting on the distributing arm 30 will cause moments about the pivot pin 28 which moments together will urge the distributing arm 30 into the material pile. The conveyor 25 will carry material rearwardly of the body and the material carried will be taken form the position adjacent the lower rearward end of the bottom portion 15. The initial carrying of material by the conveyor 25 will create a void in the material pile, and as a distributing arm 30 reaches such void it will drip into it. Such distributing arm 30 in the void will remain in that relatively lower position after encountering the material at the side of the void due to the downwardly directed moment of such arm (see FIG. 7). This distributing arm 30 will cut into the mater pile and will act to move a large amount of material in the clockwise direction to the conveyor 25. As each additional distributing arm 30 approaches the voids created in the material pile the aforesaid action will repeat itself. The hub member 26 can be rotated clockwise and the conveyor 25 operated until all the material is discharged from the body 12. Any material which tends to adhere to the sloping portion 18 and 19 of the sidewalls 15 and 16 and the sloping front end of body 12 is wiped clear by the finger portions 36 and cylindrical rods 37 of the distributing arms 30.

The attitude in which the distributing arm 30 can be stabilized with respect to the level of material pile can be varied by suitably adjusting the location of the pivot pins 28 with respect to the body 12 and by suitably varying the length of the support portion 32 of each distributing arm 30 together with the length, shape and inclination of the working portion 34 of each distributing arm 30.

The pivot pins 28 can be skewed, extended laterally at an angle to, spaced parallel to a radius extending from the axis of rotation of the hub member 26. It is important that whichever orientation of pivot pins selected, the distributing arm 30 pivot upwardly as the result of the vertical and horizontal components of the resultant force acting on the working portion 34 of such rotating distributing arm until such portion 34 reaches a plane where the line of direction of the resultant dynamic force passes through the pivot point at which location the moments about the pivot point caused by the vertical and horizontal components of the resultant dynamic force cancel each other. Equally important is that the working portion 34 of each distributing arm 30 be positioned relative to the pivot pin 28 during rotation in a direction opposite of that where the resultant dynamic force results in the upward movement of distributing arm 30 such that a downward urging of distributing arm 30 results. Further with respect to the interaction of the dynamic forces acting on distributing arm 30, it will be appreciated that the inclination of the working portion 34 can vary over a range and be upwardly or downwardly inclined within the respective plane containing the axis of hub member 26 and the bottom edge of face 34a. Furthermore, working portion 34 can have a curvilinear surface since the above described interaction of dynamic forces is independent of the shape of working portion 34.

Figure 8:
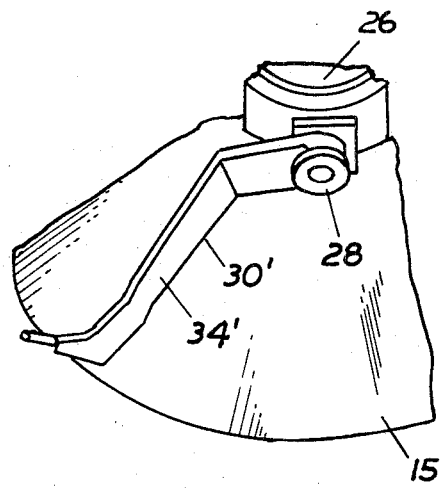
FIG. 8 is a perspective view of a part of the apparatus of FIG. 2, showing another embodiment of the arm element of the present invention.

FIG. 8 shows a distributing arm 30' for use in the present invention, which arm has an outer portion of its working portion 34' curvilinearly bent to be convex with a direction of counterclockwise rotation of the hub member 26. It has been observed that by using such a distributing arm 30' some material is carried over the conveyor 25 during the discharge cycle and thus discharging of material slower than that of the heretofore described embodiment. It has also been observed that the distributing arm 30' also rises at a slower rate with respect to the level of material than does the distributing arm 30 having a straight working portion 34.

Figure 9:
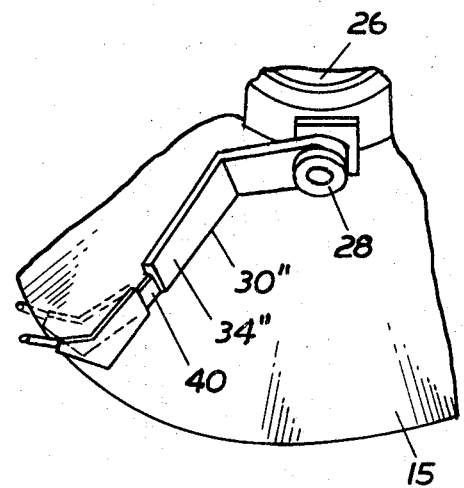
FIG. 9 is a view similar to FIG. 8 showing still another embodiment of the arm element of the present invention.

FIG. 9 shows a distributing arm 30'' having an end portion of its working portion 34'' attached thereto by means of a flat resilient spring steel member 40 rigidly fixed with the end portion and the rest of working portion 34''. When material is loaded into body 12 and the hub member 26 is rotated counterclockwise the end portion of working portion 34'' will deflect in a clockwise direction due to the forces acting thereon. The deflected end of working portion 34'' will be retained in such position by the sloping walls, 18, 19 and the sloping portion of the forward lend of forward end of body 12 until the distributing arm 30'' reaches the trough 24 in the area of conveyor 25, that is, rearwardly of sloping portion 18 of side wall 16, at which point the end portion of working portion 34'' will deflect and thereby throw the material rearwardly of the body 12. This behavior of the distributing arm 30'' will result in the body 12 making greater use of its storage capacity. The distributing arm 30'' will also aid the discharging of the material from the body 12 by urging material in a clockwise direction and throwing it rearwardly of the body 12 as it reaches trough 24 above the conveyor 25.

Figure 10:
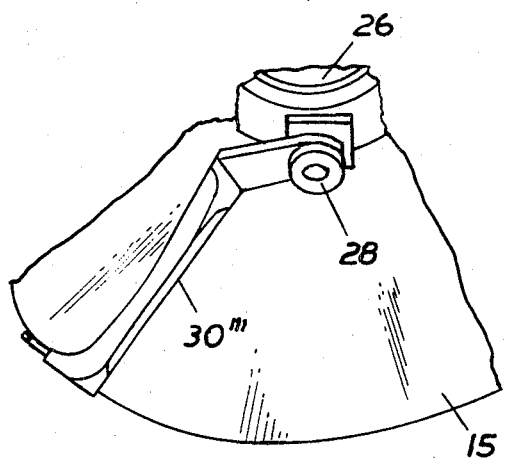
FIG. 10 is a view similar to FIG. 8 showing yet another embodiment of the arm element of the present invention.
Figure 12:
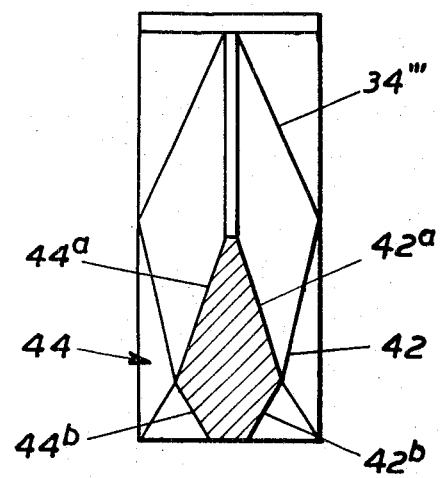
FIG. 12 is an enlarged sectional view taken along line 12-12 of FIG. 11.
Figure 11:
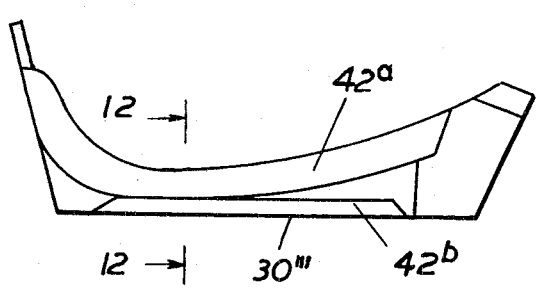
FIG. 11 is a side elevation view of the arm element shown in the perspective of FIG. 10.

FIGS. 10, 11 and 12 show a distributing arm 30''' having a working portion 34''' having a modified diamond-shaped cross section as shown in FIG. 12. This diamond-shape cross section is symmetrical about a plane extending longitudinally through the working portion 34''' of distributing arm 30''', which plane is normal to the surface of bottom portion 15 of an empty body 12. Working portion 34''' has an advancing face 42 in the direction of counterclockwise rotation of hub member 26, which advancing face has an upper surface 42a inclined to face upwardly in the counterclockwise direction of rotation and a lower surface 42b inclined to face downwardly in the counterclockwise direction of rotation. The working portion 34''' also has a retreating face 44 in the direction of clockwise rotation which retreating face has an upper surface 44a inclined to face upwardly in the clockwise direction and a lower surface 44b inclined to face downwardly in the clockwise direction of rotation. During the filling cycle with the hub member 26 being rotated in a counterclockwise direction the resultant dynamic force acting upon the distributing arm 30''' is normal to the lower surface 42b. Lower surface 42b is smaller in area than the surfaces of the working portions of the distributing arms described hereinbefore, therefore the resultant dynamic force acting on such lower surfaces 42b will be smaller than those acting on the working portions of distributing arms described hereinbefore. The moments acting on distributing arm 34''' is therefore smaller than the moments acting on the distributing arms described hereinbefore and the distributing arm 34''' will rise slower with the level of the material pile than the distributing arms described hereinbefore. The distributing arm 34''' is substantially coplanar with the plane of rotation of hub member 26, that is, the plane of symmetry of arm 34'' will be substantially horizontal. During the discharge cycle the lower surface 44b of retreating face 44 encounters material and has the desired inclination for downwardly pivoting the distributing arm 34'''. Lower surface 44b is smaller in area than the surface of the retreating face of the working portions of the distributing arms described hereinbefore. Thus, during discharge of material the resultant dynamic force acting on distributing arm 34''' is less than the resultant dynamic force acting on the distributing arms described hereinbefore and accordingly, the moment acting on distributing arm 34''' is less. As a result of this distributing arm 34''' will move downwardly into a material pile at a slower rate than the distributing arms described hereinbefore while at the same time demanding less torque output by the driving means.

Hub member 26 can be made to float upwardly and downwardly with respect to bottom portion 15. By such a floating arrangement the depth of body 12 could be made greater to thereby increase its storage capacity.

A multiplicity of rotating distributing means (i.e. hub member 26-distributing arm 30 assemblies) can be suitably arranged in a storage body to suit desired applications. Furthermore, the hub member 26 can be rotated about an axis of rotation set at an angle to a vertical plane passing through the selected storage body.

The distributing arms 30 can be arranged to move along a noncircular orbit since the dynamic force will interact to raise and lower a distributing arm 30 regardless of the path of movement. For example, distributing arms 30 can be pivotably supported as previously described on a single driven chain, such as used with a single chain flight conveyor, and the assembly suitably arranged to move in an orbit extending over the bottom surface of a desired load compartment.

Having described embodiments of my present invention in accordance with the patent statutes, it is to be realized that modifications may be made without departing from the broad scope of this invention. Accordingly, it is respectfully requested that the scope of this invention not be restricted to the specific forms shown for the uses mentioned except to the extent indicated in the appended claims.

I claim:
1. A material-handling apparatus comprising: a body defining an upwardly open storage compartment having a bottom surface; at least one arm member within said compartment movable in an orbit over and above a substantial part of said bottom surface to distribute material throughout said compartment, said arm member having a support portion extending generally normal to a radius vector of said path, one end of said support portion being supported for pivoting about said radius vector, said arm member having an elongated material-encountering portion extending at an obtuse angle to said support portion obliquely away from said radius vector generally in the same direction and having an upwardly extending working face thereon.

2. A material-handling apparatus as set forth in claim 1 wherein said material-encountering portion trails said pivot axis of said support member when said arm member moves in one direction of movement.

3. A material-handling apparatus as set forth in claim 1 additionally comprising: an elongated transporting means located downwardly adjacent an opening in in a portion of said storage compartment and operable to remove material from said compartment portion.

4. A material-handling apparatus as set forth in claim 3 wherein said arm member is reversibly movable about an axis and said radius vector is a radial line; said material-encountering portion of said arm member has an advancing face and a retreating face with respect to a given direction of movement of said arm member; a said advancing face has at least a portion thereof inclined upwardly away from said radial line so that said arm member will pivot upwardly with respect to said bottom surface during movement of said arm member in said given direction when said material-encountering portion encounters material until the line of direction of the resultant force passes through said pivot axis; and said retreating face having at least a portion thereof inclined upwardly away from said radial line so that said arm member will be urged downwardly when said material-encountering portion encounters material during movement of said arm member in a direction opposite said given direction of movement.

5. A material-handling apparatus as set forth in claim 3 wherein said arm member is movable in a closed path having an axis extending upwardly from said bottom surface.

6. A material-handling apparatus as set forth in claim 5 wherein said arm member is rotatable in a generally circular closed path.

7. A material-handling apparatus as set forth in claim 6 including a hub member extending from said bottom surface and rotatable about an upwardly extending axis from said bottom surface; said arm member is pivotably supported at an upper region of said hub member; said pivot axis extends radially from said upwardly extending axis.

8. A material-handling apparatus as set forth in claim 3 wherein said material-encountering portion of said arm member has a portion of the free end thereof curvilinearly bent to form a convex section with respect to said one direction of movement.

9. A material-handling apparatus as set forth in claim 1 wherein said material-encountering portion of said arm member has a portion of the free end thereof resiliently attached to the remainder of said material-encountering portion.

10. A material-handling apparatus as set forth in claim 1 wherein said material-encountering portion of said arm member has a diamond-shaped cross section having at least four surfaces inclined with respect to the line of movement of said given direction of movement.

11. A material-handling apparatus as set forth in claim 10 wherein said material-encountering portion of said arm member has two of said four surfaces facing in an advancing direction with respect to said given direction of movement and two of said four surfaces facing in a retreating direction with respect to said given direction of movement of said arm member.

12. A material-handling apparatus as set forth in claim 4 wherein said advancing face and said retreating face are uniplanar surfaces substantially parallel with each other.